(12) United States Patent
Baba (10) Patent No.: US 8,745,752 B2
(45) Date of Patent: Jun. 3, 2014

(54) DETECTION METHOD FOR DETECTING FRAUD

(75) Inventor: Tsutomu Baba, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 13/382,446

(22) PCT Filed: Jul. 7, 2010

(86) PCT No.: PCT/JP2010/061503
§ 371 (c)(1),
(2), (4) Date: Feb. 2, 2012

(87) PCT Pub. No.: WO2011/004829
PCT Pub. Date: Jan. 13, 2011

(65) Prior Publication Data
US 2012/0131680 A1   May 24, 2012

(30) Foreign Application Priority Data
Jul. 9, 2009   (JP) .................................. 2009-163203

(51) Int. Cl.
*G06F 21/00*   (2013.01)
(52) U.S. Cl.
USPC ................................ 726/26; 713/194; 726/34
(58) Field of Classification Search
None
See application file for complete search history.

(56) References Cited

U.S. PATENT DOCUMENTS 6,272,637 B1 *   8/2001   Little et al. ..................... 713/194
7,644,290 B2 *   1/2010   Ransom et al. ............... 713/194

FOREIGN PATENT DOCUMENTS

| JP | 2002-312245 | 10/2002 |
| JP | 2004-310405 | 11/2004 |
| JP | 2005-148969 | 6/2005 |
| JP | 2006-119987 | 5/2006 |

OTHER PUBLICATIONS

International Search Report for Application No. PCT/JP2010/061503 mailed Aug. 31, 2010.

* cited by examiner

Primary Examiner — Gilberto Barron, Jr.
Assistant Examiner — Malcolm Cribbs
(74) Attorney, Agent, or Firm — Frommer Lawrence & Haug LLP (57) ABSTRACT

A detection method for detecting fraud with respect to a card reader. The card reader includes a removal detection switch for detecting a removal from a housing of a user operation terminal, a first RAM that can erase removal detection recognition data being stored therein, according to an output signal from the detection switch, a second RAM being independent of the first RAM and storing authentication key data. The method includes erasing the removal detection recognition data is erased when the card reader is removed from the housing of the user operation terminal. Afterwards, the authentication key data is changed after completion of predetermined authentication procedures when the card reader is mounted into the housing of the user operation terminal. Then, the changed authentication key data is stored in the second RAM, while the removal detection recognition data is stored in the first RAM.

11 Claims, 5 Drawing Sheets

DETECTION METHOD FOR DETECTING FRAUD

The present application claims priority from PCT Patent Application No. PCT/JP2010/061503 filed on Jul. 7, 2010, which claims priority from Japanese Patent Application No. JP 2009-163203 filed on Jul. 9, 2009, the disclosures of which is incorporated herein by reference in its entirety.

FIELD OF THE INVENTION

The present invention relates to a detection method for detecting fraud on an electronic device machine and the like, installed in a housing of a user operation terminal for a user to conduct operation.

DESCRIPTION OF RELATED ART

In an electronic device machine installed in a housing of a user-operating terminal for a user to conduct operation, confidential data (for example, key data to be used in cryptography processing) is saved in a volatile memory chip backed up by a secondary power supply unit, and the confidential data is read out into a working memory chip from the volatile memory chip each time as required for executing various processing operations. Since the confidential data is required for various processing operations, under normal conditions, the data is so saved as not to become lost. However, when any unusual condition is detected, e.g., in the case of illegally removing the electronic device machine, a power supply to the volatile memory chip from a secondary power source and a primary power source are shut down in order to erase the confidential data. Incidentally, there are some electronic device machines in which the confidential data is kept under the supervision internally, and those electronic device machines are provided with a function to immediately change their condition so as to disable the normal operation of the electronic device machines as soon as the confidential data gets erased.

Meanwhile, a maintenance operator, who carries out maintenance and service work on an electronic device machine installed in the market, sometimes needs to dismount the electronic device machine from a housing of a user-operating terminal.

Such an action of dismounting the electronic device machine from the housing for maintenance and service work by the maintenance operator is not fraud, and therefore restoration of the normal condition is required. Meanwhile, if once the confidential data saved in the volatile memory chip is erased in such a way as described above, restoration of the normal condition cannot be implemented without any rescue function. Then, there exists a technology in which the confidential data to be erased is split in order to prepare two types of data; i.e., one set of data to be erased when a removal action is detected, and the other set of data to be erased when any other fraud is detected; and in the case of a security error where a normal operation is disabled, both the sets of data are so checked as to make a discrimination whether the electronic device machine is just removed or any fraud is conducted, such as being illegally disassembled (For example, the confidential data is split into first data and second data in the case of Japanese Unexamined Patent Application Publication No. 2004-310405 ("JP 2004-210405")). Thus, in the case of a machine that JP 2004-210405 describes, the machine is equipped with a mechanism that makes it possible to restore the machine to the condition of normal operation enabled by means of following appropriate procedures when it is judged according to a status of the erased data that the machine is under the condition of normal operation disabled due to a detection of removal of the machine. By using such a mechanism, without knowing the appropriate procedures it becomes impossible to restore the machine to the condition of normal operation when the machine is removed by fraud, and therefore a high level of security can be ensured.

Unfortunately, in the case of the machine that JP 2004-210405 describes, when it is judged that the machine is under the condition of normal operation disabled due to a detection of removal of the machine, under conditions where removal detection data (i.e., the data erased due to a removal action) needs to be re-implanted, and if a configuration is made up in such a way as to enable easy re-implantation of the data, there exists a possibility of restoration of the condition of normal operation enabled after installation of illegality even when the machine is illegally removed by anybody other than the maintenance operator, so as to eventually result in a lack of security. Meanwhile, for re-implanting the removal detection data into a removal detection memory chip while ensuring security, as a general rule, complicated procedures are likely to become necessary.

SUMMARY OF THE INVENTION

It is an object of the present invention to provide a detection method for detecting fraud, which enables easy restoration of the condition of normal operation while ensuring a high level of security even when the confidential data is erased through maintenance work and so on.

To achieve the object described above, the present invention provides the following aspects.

(1) A detection method for detecting fraud on an electronic device machine installed in a housing of a user operation terminal for a user to conduct operation; wherein the electronic device machine includes: a first detection means for detecting a removal from the housing; a first memory chip that can erase removal detection recognition data being stored therein, according to an output signal from the first detection means; a second memory chip, being independent of the first memory chip, and storing authentication key data; and in the case where the electronic device machine is removed from the housing, the removal detection recognition data is erased; afterwards the electronic device machine is mounted into the housing, and the authentication key data is changed after completion of predetermined authentication procedures; and then, the changed authentication key data is stored in the second memory chip, while the removal detection recognition data is stored in the first memory chip.

According to the present invention; the electronic device machine, provided with the first detection means for detecting a removal from the housing of the user operation terminal, is provided with the first memory chip that erases its removal detection recognition data, according to an output signal from the first detection means; and the second memory chip, being independent of the first memory chip and storing the authentication key data. In the case where the electronic device machine is removed from a higher-level device, the removal detection recognition data described above is erased. Afterwards the electronic device machine is mounted into the higher-level device, and the authentication key data described above is changed after completion of the predetermined authentication procedures. Then, the changed authentication key data is stored in the second memory chip, while the removal detection recognition data is stored in the first memory chip. Therefore, every time when the predetermined authentication procedures are completed by a maintenance operator, the authentication key data stored in the second memory chip is changed.

Accordingly, even when the maintenance operator removes the electronic device machine, for example, for maintenance work (including maintenance and service work), the removal detection recognition data is (automatically) re-implanted into the first memory chip (for example, from a built-in ROM of a CPU, and the like) through the predetermined authentication procedures described above (for example, by inserting a predetermined card, owned by the maintenance operator, into the lower-level device, and the like) and changing the authentication key data stored in the second memory chip. Therefore, the condition of normal operation can easily be restored. In the meantime, in the case where anybody other than the maintenance operator illegally removes the electronic device machine, the predetermined authentication procedures are not carried out, and therefore the condition of normal operation cannot be restored. Furthermore, even if the person other than the maintenance operator decodes and obtains the authentication key data existing in the second memory chip in some way, the authentication key data existing in the second memory chip is already changed at the time when the maintenance operator carries out the predetermined authentication procedures and restoration of the condition of normal operation, so that the authentication key data decoded and obtained cannot be used any more. Thus, according to the present invention, the restoration work can easily be implemented while a high level of security being ensured.

Incidentally, there is no restriction on the first memory chip and/or the second memory chip. For example, a volatile memory such as a RAM, or a non-volatile memory such as an EEPROM and FROM may be used for them. If the former is used, erasing time can be shortened. Meanwhile, if the latter is used, a program and so on for actively erasing the confidential data existing in the non-volatile memory are separately required.

As for "erasing the data", the power supply may be shut down in a way to make the data lost, and there is also another way to rewrite the data with 'all 0xFF' or 'all 0x00'. Furthermore, the data may also be rewritten with still another specific type of data. Moreover, the data may also be rewritten with random numbers. Still further, all data area may not be rewritten, but alternatively only a predetermined data area or a randomly chosen specific data area may be rewritten.

(2) The detection method for detecting fraud; wherein the authentication key data stored in the second memory chip is erased in the case where any fraud happens in the electronic device machine itself.

According to the present invention; in the case where any fraud happens in the electronic device machine itself described above, the authentication key data stored in the second memory chip is erased. Therefore, when there happens any fraud such as removing a cover of the electronic device machine, drilling a hole in the electronic device machine, and the like, restoration of the condition of normal operation enabled becomes totally impossible. Accordingly, a higher level of security can be ensured.

(3) The detection method for detecting fraud; wherein provided are a power supply source for supplying the first memory chip and the second memory chip with electric power, and a power supply control means for controlling the power supply from the power supply source; and at least either of erasing the removal detection recognition data from the first memory chip, and erasing the authentication key data from the second memory chip, is carried out through shutting down the power supply with the power supply control means.

According to the present invention; at least either of erasing the removal detection recognition data from the first memory chip described above, and erasing the authentication key data from the second memory chip described above, is carried out through shutting down the power supply with the power supply control means. Therefore, no data erasing program is needed so that a high level of security can be ensured with a simpler hardware configuration.

For this matter, "the power supply source" and "the power supply control means" may be provided separately for each of the first memory chip and the second memory chip, or both the memory chips may be controlled by a common power supply source and a common power supply control means. Moreover, since the data is erased by shutting down the power supply, each of the first memory chip and the second memory chip according to the present invention is a volatile memory.

(4) The detection method for detecting fraud; wherein provided is a second detection means for detecting the fraud in the case where any fraud happens in the electronic device machine itself.

According to the present invention, provided is a second detection means for detecting the fraud in the case where any fraud happens in the electronic device machine itself. Therefore, for example, even when there happens any fraud such as removing a cover of the electronic device machine, drilling a hole in the electronic device machine, and the like, the authentication key data stored in the second memory chip is erased according to a detection signal from the second detection means so that it is possible to disable restoration of the condition of normal operation enabled.

(5) The detection method for detecting fraud; wherein the predetermined authentication procedures are implemented with at least either of the conditions being met; i.e., a maintenance tool being connected to the electronic device machine, and a maintenance card being inserted.

According to the present invention, the predetermined authentication procedures described above are implemented with at least either of the conditions being met; i.e., a maintenance tool being connected to the electronic device machine, and a maintenance card being inserted. Therefore, the maintenance operator can restore the condition of normal operation enabled through simple procedures. Especially, in the case of the authentication procedures under the condition of the maintenance card being inserted, a high level of convenience can be maintained since the maintenance card itself is light and easy to carry.

By means of the detection method for detecting fraud according to the present invention, at the time when a maintenance operator restores an electronic device machine to the condition of normal operation after once removing the electronic device machine from a housing of a user operation terminal, the restoration work can be carried out while satisfying both a high level of security and easiness of the work.

BRIEF DESCRIPTION OF THE DRAWINGS

FIGS. 3 (A) and (B) is a block diagram showing a general concept of operation up to re-implantation of removal detection recognition data into a RAM;

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

First Embodiment

Configuration of an Electronic Device Machine

An embodiment of the present invention is described below with reference to the accompanying drawings.

Figure 1:
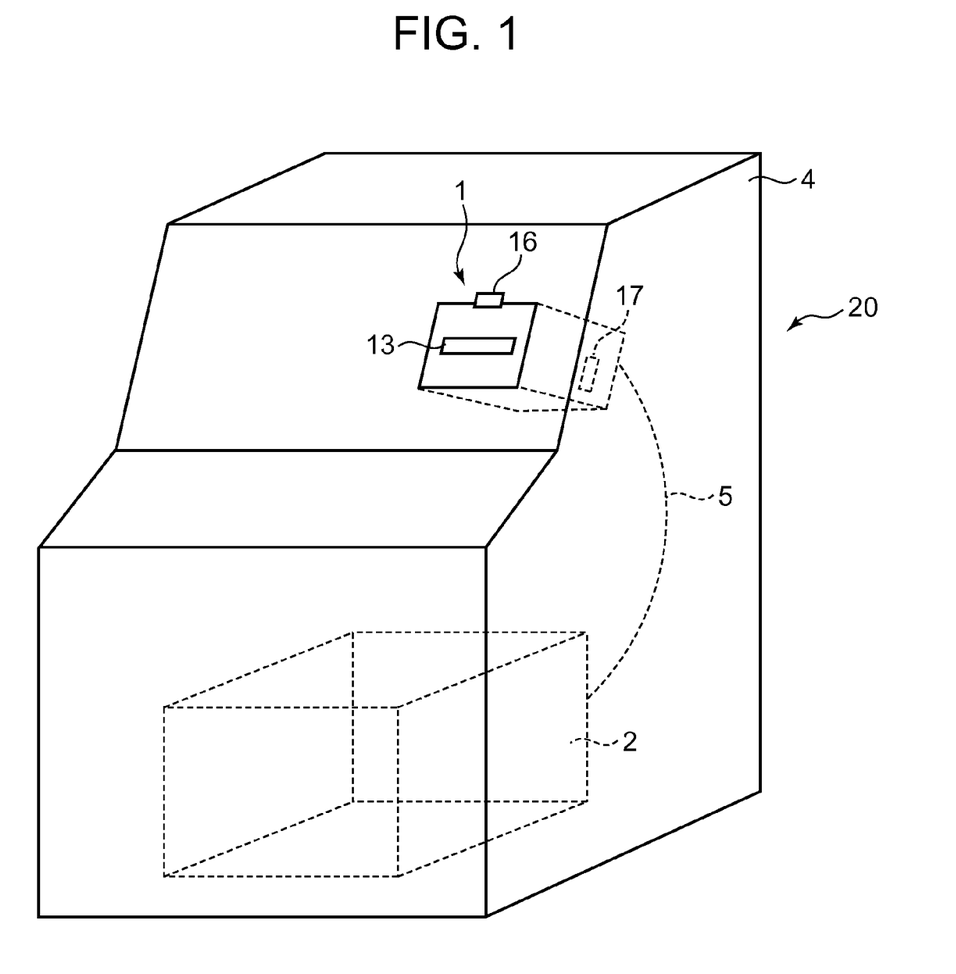
FIG. 1 shows a configuration of a user operation terminal to be used in a detection method for detecting fraud according to an embodiment of the present invention.
Figure 2:
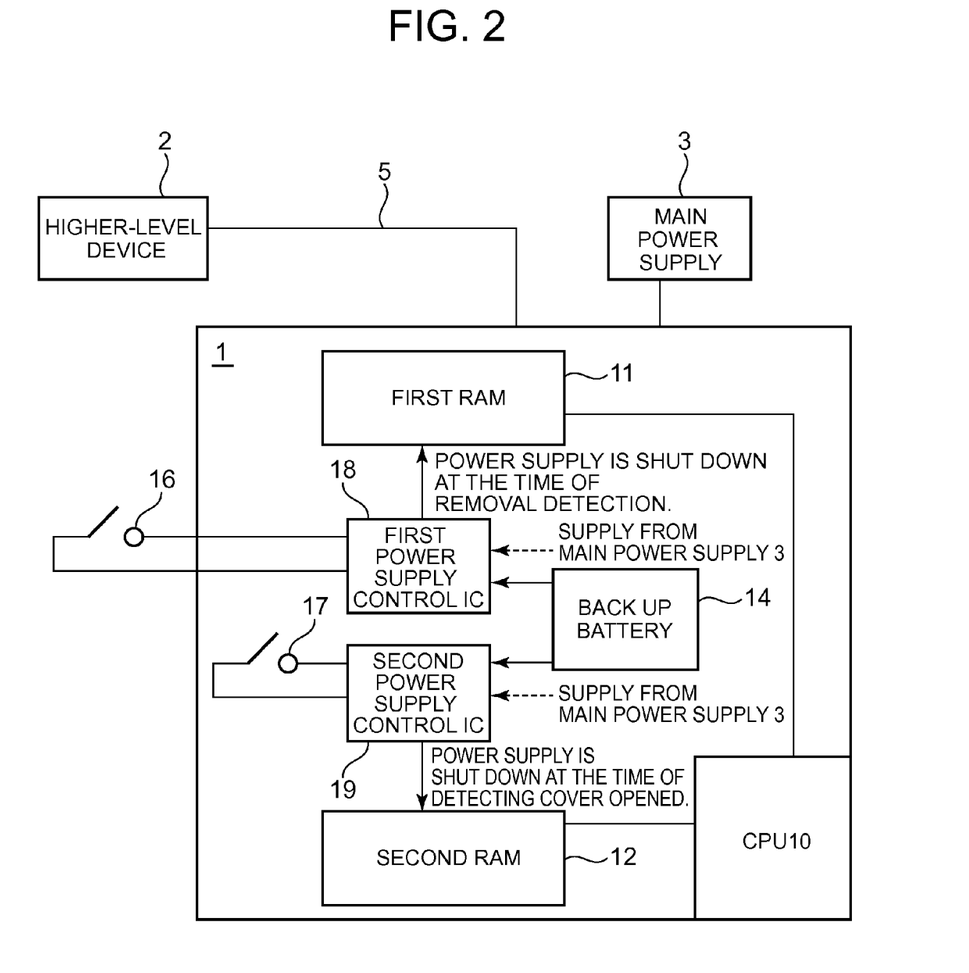
FIG. 2 is a block diagram showing an electrical configuration of a card reader to be used in the detection method for detecting fraud according to the embodiment of the present invention.

FIG. 1 shows a configuration of a user operation terminal 20 to be used in a detection method for detecting fraud according to an embodiment of the present invention. FIG. 2 is a block diagram showing an electrical configuration of a card reader 1 to be used in the detection method for detecting fraud according to the embodiment of the present invention. In the present embodiment, the card reader 1 is adopted as an example for the "electronic device equipment."

The user operation terminal 20 is operated by a user. For example, a terminal installed in a gas station, an automated teller machine (ATM) of a bank, and the like correspond to the user operation terminal 20. As shown in FIG. 1, provided in a housing 4 of the user operation terminal 20 are the card reader 1 and a higher-level device 2, and meanwhile the card reader 1 includes a card insertion slot 13, through which the user inserts a card, at a front side of the housing 4. Then, the card reader 1 and the higher-level device 2 are connected each other with a communication cable 5 of RS232C and the like.

Furthermore, the card reader 1 includes a removal detection switch 16, as a first detection means for detecting a tampering action (fraud) of a removing illegally from the housing 4, as well as an open cover detection switch 17, as a second detection means for detecting fraud of removing (opening) a cover of the card reader 1 at the time when the fraud happens.

Although the higher-level device 2 is installed in the housing 4 of the user operation terminal 20 as shown in FIG. 1, alternatively it may be located at a place being separate from the user operation terminal 20.

The card reader 1 is an electronic device machine that reproduces information recorded in a card medium such as an IC card, a magnetic card, and the like, and also records an update and so on into a card medium. The card reader 1 includes a CPU 10, a first RAM 11 as a first memory chip, a second RAM 12 as a second memory chip, a first power supply control IC 18 and a second power supply control IC 19 as a power supply control unit, a backup power supply (battery) (Backup battery) 14 as a power supply source, the removal detection switch 16 (for detecting a removal from the housing 4 of the user operation terminal 20), and the open cover detection switch 17. Each constituent element is electrically connected at least through a bus and the like illustrated with a solid line (or an arrowed solid line) in the drawing.

The CPU 10 is responsible for controlling an entire section of the card reader 1. Namely, calling an initializing program and a base program out of a ROM and the like that are not shown in FIG. 2, the CPU 10 is responsible for controlling the entire section of the card reader 1 by means of executing those programs. Moreover, receiving a command from the higher-level device 2, the CPU 10 executes various processing operations (such as an application program and so on) according to the command. Furthermore, the CPU 10 includes a RAM and a ROM, which are internally built in and not shown in the drawing. The built-in ROM beforehand stores a program for executing a control operation of the CPU 10, and meanwhile the built-in RAM forms various memory areas that the CPU 10 uses for arithmetic processing.

The first and second power supply control ICs 18 and 19 supply electric power, coming from a main power supply 3 and the backup power supply 14, to the first RAM 11 and the second RAM 12, respectively. In normal operation, the electric power coming from the main power supply 3 is supplied to the first RAM 11 and the second RAM 12; and when the power supply is off, the electric power coming from the backup power supply 14 is supplied to the first RAM 11 and the second RAM 12. The first and second power supply control ICs 18 and 19 work as an example of "a power supply control means" for controlling (e.g., shutting down) the power supply from the main power supply 3 or the backup power supply 14.

The removal detection switch 16 works as an example of "the first detection means" for detecting the card reader 1 having been removed from the housing 4 of the user operation terminal 100. If the removal detection switch 16 (something mechanical) materialized with any one of a lever, a button, a sheet switch and the like is changed from its closed condition to open condition, a predetermined signal is sent to the first power supply control IC 18 (for example, a 'non-zero' current changes to 'zero'). Then, the first power supply control IC 18 shuts down the power supply to the first RAM 11 according to the signal.

Not being a mechanical device, alternatively the removal detection switch 16 may be an optical device such as a photo sensor and the like, or a magnetic device such as a magnetic sensor and so on.

When there happens fraud of the cover of the card reader 1 being removed (opened) (at the time of detecting the cover being opened), the open cover detection switch 17 works as an example of "the second detection means" for detecting the fraud.

Concretely to describe, the card reader 1 is structured as a fully closed section, as shown in FIG. 1. For more details, the card reader 1 is, for example, so structured as to be fully closed with a storage case in which the card insertion slot 13 for inserting a card is formed, and a cover that covers an opening of the storage case. Stored inside the storage case are: a circuit board on which mounted are a circuit for controlling operation of the card reader 1, a volatile memory chip storing a program and data, and the like; a card transfer means; a reading/writing means; and so on. Then, the opening of the storage case is covered with the cover. It is needed for the card reader 1, which handles data with high confidentiality, to protect the machine itself against destruction and prevent the data saved internally from being tampered, after opening the cover by a third person. Until now, in order to present such an action, a machine handling data with high confidentiality is equipped with a mechanical switch or an optical sensor; and measures are taken in such a way that, if the cover being opened illegally is detected, the data of the memory existing internally is destroyed according to the detection signal. The open cover detection switch 17 as the switch described above is, for example, a micro switch, and the detection can be implemented by switching of the micro switch between ON and OFF. Furthermore, when the open cover detection switch 17 such as a micro switch is changed from its closed condition to open condition, a predetermined signal is sent to the second power supply control IC 19. According to the signal, the second power supply control IC 19 shuts down the power supply to the second RAM 12. Incidentally, the open cover detection switch 17 is not limited to a micro switch, and it may be any other type of switch.

Thus, erasing removal detection recognition data from the first RAM 11, and erasing authentication key data from the second RAM 12 is carried out through shutting down the power supply with the first power supply control IC 18 and the second power supply control IC 19, respectively. Although, not shown in FIG. 2, the card reader 1 may include an EEPROM and a flash memory chip, which may store electronic information such as confidential data, an execution program, error detection symbols (CRC, Check sum, and BCC) and so on.

For erasing the data, the power supply may be shut down in a way to make the data lost, and there is also another way to rewrite the data with 'all 0xFF' or 'all 0x00'. Furthermore, the data may also be rewritten with still another specific type of data (For example, with 'all 0x11', 'all 0x22', or 'repeating a series of 0x11, 0x01, 0x02, 0x03 . . . , 0x0F'). Moreover, the data may also be rewritten with random numbers. Still further, all data area may not be rewritten, but alternatively only a specific data area predetermined or randomly chosen may be rewritten.

Described in detail next here are the first RAM 11 and the second RAM 12. Being a volatile memory chip, the first RAM 11 is an example of the "first memory chip" that can erase the removal detection recognition data stored in the memory chip itself according to an output signal coming from the removal detection switch 16. In the meantime, the second RAM 12, being also a volatile memory chip, is an example of the "second memory chip" that is independent from the first RAM 11 and stores the authentication key data.

According to the card reader 1 including the first RAM 11 and the second RAM 12 as described above, for example, when a maintenance operator reinstalls the card reader 1 and restores it to the condition of normal operation after once having removed the card reader 1 from the housing 4 of the user operation terminal 20 for maintenance work (including maintenance and service work), the restoration work can easily be carried out while a high level of security being ensured. Work steps for the restoration work are described below in detail with reference to FIGS. 3(A) and (B).

Figure 3A:
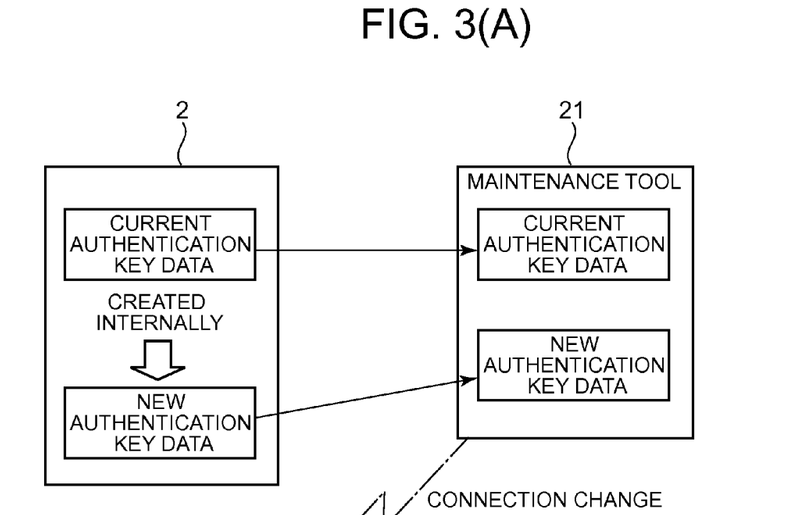
Figure 3B:
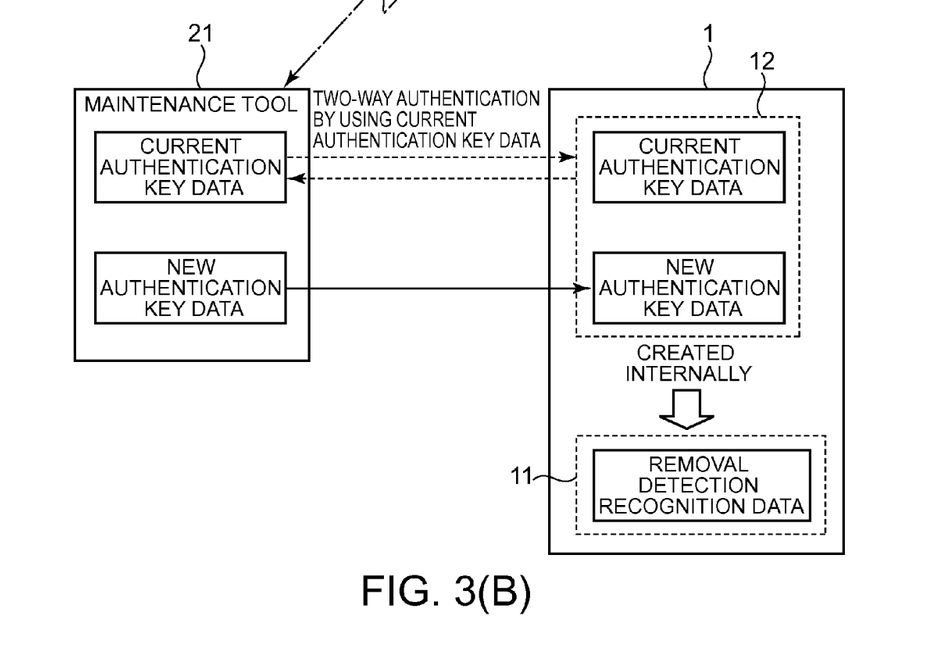

Restoration Work:

FIGS. 3(A) and (B) include a block diagram showing a general concept of operation until re-implantation of the removal detection recognition data into the first RAM 11.

As described in FIG. 3 (A), the maintenance operator removes the card reader 1 from the housing 4 of the user operation terminal 20 for maintenance work (including maintenance and service work). Then, after the maintenance work finishes, at first a maintenance tool 21 (a specialized machine) owned by the maintenance operator and the higher-level device 2 are connected each other with a cable or wireless. Subsequently, current authentication key data at the time and new authentication key data created in the higher-level device 2 are implanted into the maintenance tool 21 from the higher-level device 2. After the implantation of the current authentication key data and the new authentication key data, the maintenance tool 21 is disconnected from the higher-level device 2. The maintenance tool 21 is owned by the maintenance operator, and therefore, in its memory, it keeps data for executing a two-way authentication command, which is described later. The maintenance tool 21 may be, for example, a laptop computer.

Subsequently, the card reader 1, for which maintenance work has already been completed, is mounted into the housing 4 of the user operation terminal 20. At that time, the removal detection data, which was stored in the first RAM 11 until the removal of the card reader 1 out of the housing 4, has already been erased by a function of the removal detection switch 16 as described above. At the time, the card reader 1 returns a security error for every command of the higher-level device 2, being in the condition that the normal operation cannot be carried out at all.

Next, as described in FIG. 3(B), the maintenance tool 21 and the card reader 1 are connected each other. At the time, the only command that the card reader 1 can execute is the two-way authentication command installed in the maintenance tool 21 owned by the maintenance operator, while the two-way authentication command being dedicated for a maintenance mode.

Then, a two-way authentication operation is carried out by using the current authentication key data stored in each of the maintenance tool 21 and the card reader 1, for verifying that both the devices are authentic. After the two-way authentication operation normally finishes, only an authentication key data change command is made to be executable.

After execution of the two-way authentication operation, executed is an operation of rewriting the current authentication key data, stored in the second RAM 12 of the card reader 1, with the new authentication key data obtained beforehand from the higher-level device 2. As a result of the operation, the new authentication key data is stored in the second RAM 12. After changing to the new authentication key data, the card reader 1 automatically implants the removal detection recognition data created in the card reader 1, for example, from the built-in ROM of the CPU 10 and the like into the removal detection memory chip (the first RAM 11).

Figure 4:
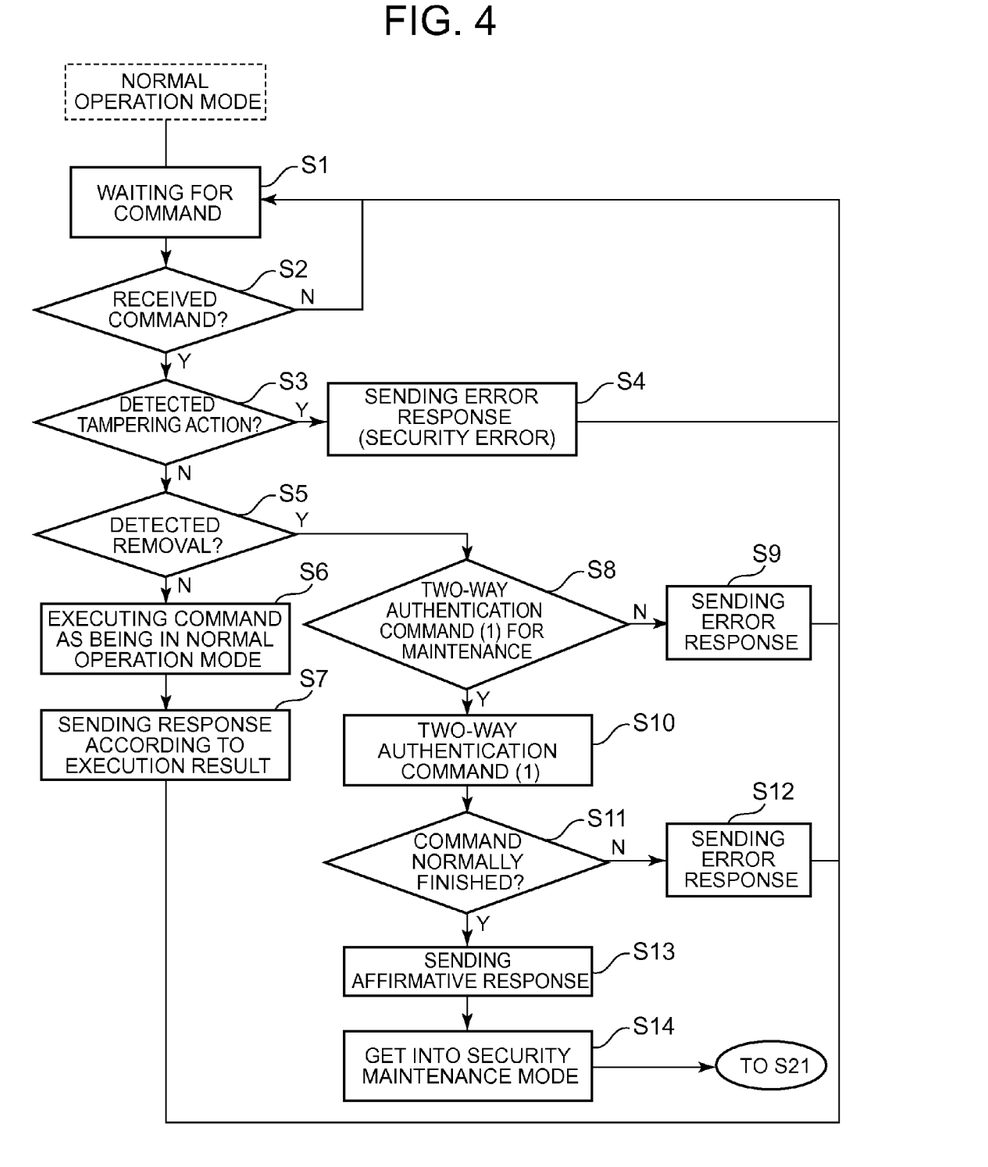
FIG. 4 is a flowchart showing a workflow of the detection method for detecting fraud according to the embodiment of the present invention.
Figure 5:
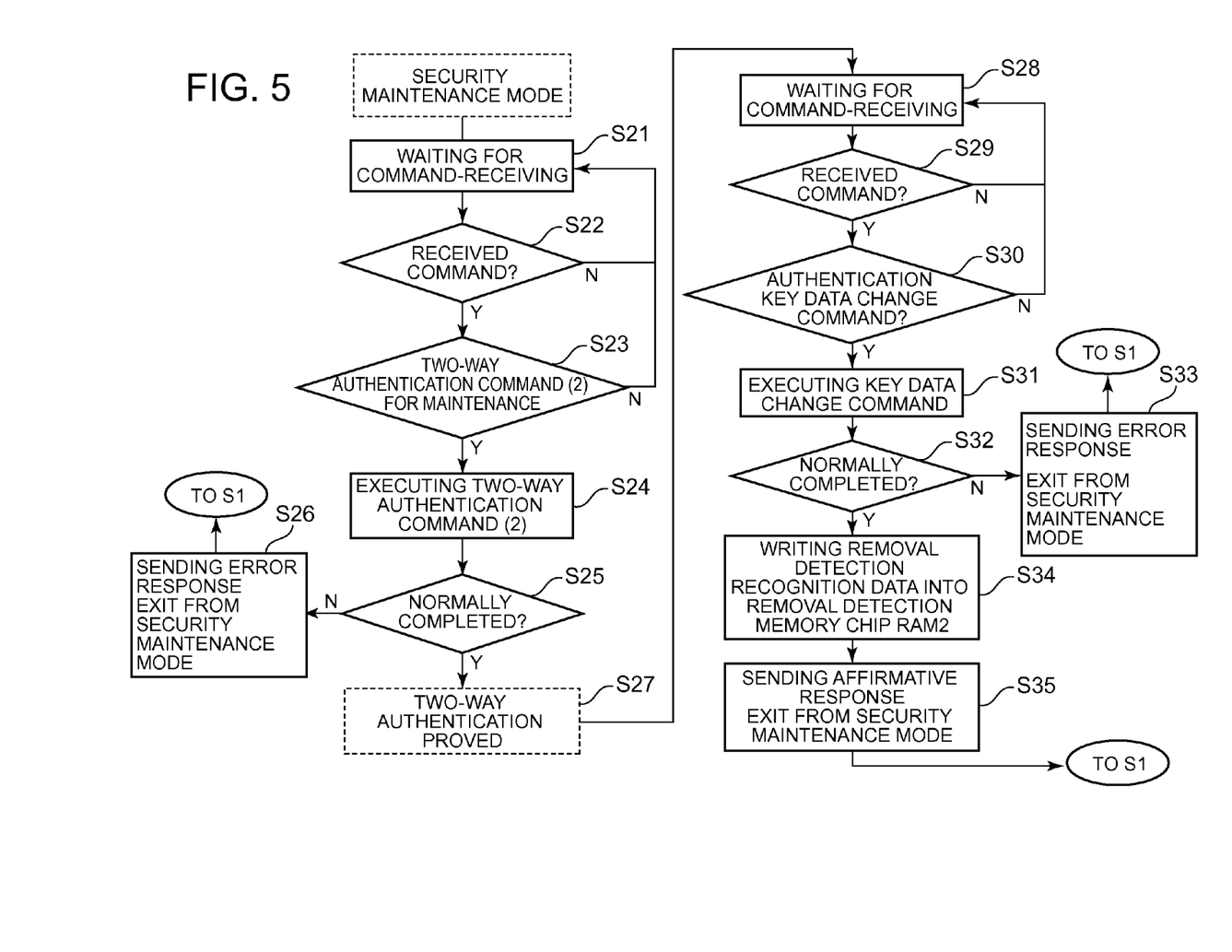
FIG. 5 is a flowchart showing a workflow of the detection method for detecting fraud according to the embodiment of the present invention.

Workflow of Detection Method Detecting Fraud:

FIG. 4 and FIG. 5 are flowcharts individually showing a workflow of the detection method for detecting fraud according to the embodiment of the present invention. FIG. 4 is a flowchart of a transition from a normal operation mode to a maintenance mode in the card reader 1, while FIG. 5 is a flowchart in a security maintenance mode of the card reader 1.

With reference to FIG. 4 and FIG. 5, explained is a case where the maintenance operator reinstalls the card reader 1 and restores it to the condition of normal operation after once removing the card reader 1 from the housing 4 of the user operation terminal 20 for maintenance work (including maintenance and service work). For that purpose described above, the card reader 1 is in the condition of being connected to the maintenance tool 21, as shown in FIG. 3(B)

Incidentally, Step S1 through Step S7 shown in FIG. 4 represent a flowchart in the normal operation mode of the card reader 1. Under the condition, being connected to the higher-level device 2 with the communication cable 5, the card reader 1 is placed in the housing 4 of the user operation terminal 20. Then, receiving a command from the higher-level device 2 through the communication cable 5, the card reader 1 executes an operation (at the CPU 10 described above) commanded by the command, and returns an operation result to the higher-level device 2.

In FIG. 4, the card reader 1 is under the condition of waiting for a command sent from the maintenance tool 21 (Step S1).

Under the condition, the CPU 10 judges whether a command has been received or not (Step S2). If the command has been received (Step S2: YES), it is judged whether or not a tampering action is detected (Step S3). If any tampering action, such as a removal, skimming, and the like, is detected, an error response (a security error) is sent to the higher-level device 2 (Step S4). After sending an error response (a security error) to the maintenance tool 21, the card reader 1 returns to the waiting-command condition of waiting for a command sent from the higher-level device 2 (Step S1).

At Step S3, if no tampering action is detected (Step S3: NO), it is judged next by using the removal detection switch 16 whether or not any removal is detected (Step S5). If no removal is detected (Step S5: NO), a command as being in the normal operation mode is executed (Step S6). Then, a response is sent to the maintenance tool 21 according to an execution result (Step S7).

In the meantime, if a removal is detected, or in other words, if the removal detection switch 16 operates and detects the card reader 1 being removed from the housing 4 (Step S5: YES), it is judged whether or not a two-way authentication command (1) for maintenance is received from the maintenance tool 21 described above (Step S8). If the two-way authentication command (1) is not received (Step S8: NO), an error response is sent to the maintenance tool 21 (Step S9). Then, after sending the error response (a security error) to the maintenance tool 21, the card reader 1 returns to the waiting-command condition of waiting for a command sent from the higher-level device 2 (Step S1). At Step S8, if the two-way authentication command (1) is received (Step S8: YES), the CPU 10 executes the two-way authentication command (1) (Step S10).

Then, if the two-way authentication command (1) does not normally finish (Step S11: NO), an error response is sent to the maintenance tool 21 (Step S12). Then, after sending the error response (a security error) to the maintenance tool 21, the card reader 1 returns to the waiting-command condition of waiting for a command sent from the maintenance tool 21 (Step S1).

At Step S10, if the two-way authentication command (1) normally finishes (Step S11: YES), an affirmative response is sent to the maintenance tool 21 (Step S13). Then, the card reader 1 gets into the security maintenance mode as shown in FIG. 5 (Step S14).

In the security maintenance mode shown in FIG. 5, the condition of waiting for a command-receiving continues (Step S21); and if a command sent from the maintenance tool 21 is received (Step S22: YES), it is judged whether or not the command is a two-way authentication command (2) for maintenance (Step S23). If it is a two-way authentication command (2) (Step S23: YES), the two-way authentication command (2) is executed (Step S24) and then it is judged whether or not if the two-way authentication command (2) normally finishes (Step S25). If it does not normally finish (Step S25: NO), an error response is sent to the maintenance tool 21, and the card reader 1 exits from the security maintenance mode (Step S26). In other words, the card reader 1 returns to the waiting-command condition of Step S1 shown in FIG. 4.

Incidentally, the two-way authentication commands (1) and (2) are commands to be used for verifying whether or not the commanded card reader 1 is authentic, at the time when the maintenance tool 21 gives a command to the card reader 1 on various operations. In the present embodiment, the two-way authentication commands (1) and (2) are prepared as separate commands in order to ensure a high level of security. Although only the two-way authentication command (2) is taken into account in the present embodiment, other two-way authentication commands (3) and (4) may also be used for a still higher level of security in addition to these two-way authentication commands (1) and (2) for triple and quadruple two-way authentication, respectively.

In the meantime, if the two-way authentication command (2) normally finishes (Step S25: YES), the two-way authentication is verified; that is to say, the authenticity of the card reader 1 is proved (Step S27). Then, the card reader 1 gets into the condition of waiting for receiving a command sent from the maintenance tool 21 (Step S28).

The card reader 1 receives a command sent from the maintenance tool 21 (Step S29). Then, if the command is an authentication key data change command (Step S30: YES), the CPU 10 executes the authentication key data change command. Namely, the new authentication key data obtained from the maintenance tool 21 via the maintenance tool 21 is stored in the second RAM 12 (Step S31).

In the case of a normal completion of the saving operation, namely in the case where the new authentication key data obtained from the maintenance tool 21 is stored in the second RAM 12 (Step S32: YES), the CPU 10 writes new removal detection recognition data generated by the CPU 10 (inside the card reader 1) into the first RAM 11 (Step S34). At the end, sending the maintenance tool 21 an affirmative response indicating that the new authentication key data and the new removal detection recognition data have been stored, and exiting from the security maintenance mode to get into the normal operation mode, the card reader 1 returns to the waiting-command condition of waiting for a command sent from the maintenance tool 21 (Step S35).

At Step S32, in the case of the saving operation having not finished normally (Step S32: NO), an error response is sent to the maintenance tool 21; and exiting from the security maintenance mode, the card reader 1 returns to the waiting-command condition of waiting for a command sent from the maintenance tool 21 (Step S33). Thus, the card reader 1 returns into the condition of normal operation; and being disconnected from the maintenance tool 21, the card reader 1 is connected to the higher-level device 2. Then, the card reader 1 gets into the waiting-command condition (Step S1) shown in FIG. 4.

Advantageous Effect of the Embodiment:

According to the detection method for detecting fraud of the present embodiment as described above; in the case where the card reader 1 is removed from the housing 4 of the user operation terminal 20, the removal detection recognition data is erased with the removal detection switch 16. Afterwards, the card reader 1 is mounted into the housing 4 of the user operation terminal 20, and the authentication key data is changed (Step S31) after completion of predetermined authentication procedures (Steps S8, S10, S23 and S24 described above). Then, the changed authentication key data is stored in the second RAM 12 (Step S34), and the removal detection recognition data is stored in the first RAM 11. In the meantime, if any fraud (tampering action) happens (Step S3: YES) in the card reader 1 itself, the authentication key data stored in the second RAM 12 is erased. Therefore, while the condition of normal operation being restored easily (by means of fairly simple procedures of authenticating the device and changing the key data), a high level of security can be ensured. For example, even if a criminal could decode and obtain authentication key data stored at the time in some way, the authentication key data becomes disabled at a next placement time after removal for the purpose of installing a fraud function. Therefore, wiretapping cannot result in decryption so that customer information can be protected from illegal acquisition. As a result, restoration of the condition of normal operation can be achieved while a high level of security being ensured.

Second Embodiment

A method of obtaining the new authentication key data from the higher-level device 2 by the card reader 1 as the electronic device machine may be implemented in any mode, provided that security is ensured. Applied in the first embodiment described above is a mode using the maintenance tool 21 that is a dedicated device, e.g., a laptop PC and the like. However, the configuration is not limited to this mode, provided that security is ensured. For example, applied may be another mode in which the two-way authentication command and the authentication key data change command, being dedicated for maintenance work, are directly executed from the higher-level device 2. In such a case, the command operation cannot be implemented unless the higher-level device 2 and the card reader 1 are in the maintenance mode, and a maintenance card belonging to the maintenance operator is prepared. Then, configured may be a system in which insertion of the maintenance card enables the higher-level device 2 and the card reader 1 to get into the maintenance mode. Namely, in this way, insertion of the maintenance card may enable predetermined authentication procedures (such as the two-way authentication).

Third Embodiment

Even in the case of an ordinary two-way authentication as well as the two-way authentication in the maintenance mode, as long as only the authentication key data stored in the other memory chip for detection of tampering (the second RAM 12) is made use of, a series of procedures for changing the authentication key data in the maintenance mode may also be potentially decoded if once the authentication key data is decoded and obtained in some way during normal operation. Then, adopting a method described below can improve the level of security.

For example, a key component of a combination of multiple key data is created, and then it is implanted into the first RAM 11 for removal detection. Then, the key component of a combination is used for the ordinary two-way authentication. Meanwhile, in the maintenance mode under the condition of removal detection, another key component remaining in "the second RAM 12 for detection of tampering" is used for the two-way authentication. As the key component to be stored in the first RAM 11 for removal detection, listed may be a constant value for all machines, a value as a result of modifying the new authentication key data by means of a predetermined method (such as a scrambling operation, and so on), a constant value specific for each machine (such as a serial number, and the like), a random value (to be created by the CPU 10) and so forth. With respect to the random value listed in the end, the random value needs to be shared by the higher-level device 2 and the card reader 1 in some way.

Thus, in the normal operation, the card reader 1 and the higher-level device 2 carry out communication by using both the key component of the first RAM 11 and the authentication key data of the second RAM 12 (for example, with EXOR). According to this way of operation, even if the data of the first RAM 11 is erased owing to removal of the card reader 1, anybody other than the maintenance operator cannot restore the condition of normal operation. Therefore, a level of security can be further improved.

Moreover, when there happens fraud of the cover of the card reader 1 being removed (opened), the power supply to the second RAM 12 is shut down according to a detection signal from the open cover detection switch 17 in the present embodiment. The present invention is not limited to this embodiment. Alternatively, for example, an appropriate emergency stop may be implemented according to the detection signal from the open cover detection switch 17 so as not to restore the condition of normal operation enabled.

Although, the card reader 1 is adopted as an example of "the electronic device machine" in the present embodiment, the present invention is not limited to this embodiment and it can be applied to any electronic device machine that needs to protect its confidential data from an illegal removing operation and the like. Furthermore, being not limited to an application against a simple illegal removing operation, the present invention can also be applied to a machine provided with a function of switching between enabled condition and disabled condition for maintenance work.

INDUSTRIAL APPLICABILITY

The detection method for detecting fraud according to the present invention is useful for enabling easy restoration to the condition of normal operation while a high level of security being ensured.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1 Card reader
2 Higher-level device
4 Housing
10 CPU
14 Backup power supply
16 Removal detection switch
17 Open cover detection switch
18 First power supply control IC
19 Second power supply control IC
20 User operation terminal

What is claimed is:

1. A detection method for detecting fraud on an electronic device machine installed in a housing of a user operation terminal for a user to conduct operation;
   wherein the electronic device machine includes:
   a first detection device is configured to detect a removal from the housing;
   a first memory chip that can erase removal detection recognition data, being stored therein, according to an output signal from the first detection device;
   a second memory chip, being independent of the first memory chip, and storing current authentication key data; and wherein the method comprises:

erasing a first removal detection recognition data when the electronic device machine is removed from the housing;

changing the current authentication key data to new authentication key data after completing predetermined authentication procedures when the electronic device machine is re-mounted into the housing, the predetermined authentication procedures being executed when a removal of the electronic device from the housing is detected and tampering is not detected, and the predetermined authentication procedures using the current authentication key data to verify whether a device is authentic; and storing the new authentication key data in the second memory chip;

wherein, when the current authentication key data are changed to new authentication key data, the electronic device automatically creates new second removal detection recognition data and stores the new removal detection recognition data in the first memory chip.

2. The detection method for detecting fraud according to claim 1;

wherein the authentication key data stored in the second memory chip is erased in a case where any fraud happens in the electronic device machine itself.

3. The detection method for detecting fraud according to claim 1;

wherein a power supply source supplies the first memory chip and the second memory chip with electric power, and a power supply control device is configured to control the power supply from the power supply source; and wherein at least one of erasing the first removal detection recognition data from the first memory chip, and erasing the authentication key data from the second memory chip in order to change the authentication key, is carried out through shutting down the power supply with the power supply control device.

4. The detection method for detecting fraud according to claim 1;

wherein a second detection device is configured to detect a fraud in a case where any fraud happens in the electronic device machine itself.

5. The detection method for detecting fraud according to claim 1;

wherein the predetermined authentication procedures include meeting at least one of the following conditions:

a maintenance tool being connected to the electronic device machine; and a maintenance card being inserted.

6. The detection method for detecting fraud according to claim 2;

wherein a power supply source supplies the first memory chip and the second memory chip with electric power, and a power supply control device is configured to control the power supply from the power supply source; and wherein at least one of erasing the first removal detection recognition data from the first memory chip, and erasing the authentication key data from the second memory chip, is carried out through shutting down the power supply with the power supply control device.

7. The detection method for detecting fraud according to claim 2;

wherein a second detection device is configured to detect a fraud in a case where any fraud happens in the electronic device machine itself.

8. The detection method for detecting fraud according to claim 3;

wherein a second detection device is configured to detect a fraud in a case where any fraud happens in the electronic device machine itself.

9. The detection method for detecting fraud according to claim 2;

wherein the predetermined authentication procedures include meeting at least one of the following conditions:

a maintenance tool being connected to the electronic device machine; and a maintenance card being inserted.

10. The detection method for detecting fraud according to claim 3;

wherein the predetermined authentication procedures include meeting at least one of the following conditions:

a maintenance tool being connected to the electronic device machine; and a maintenance card being inserted.

11. The detection method for detecting fraud according to claim 4;

wherein the predetermined authentication procedures include meeting at least one of the following conditions:

a maintenance tool being connected to the electronic device machine; and a maintenance card being inserted.

* * * * *